June 20, 1933. G. W. BELL 1,914,553
ANTIVIBRATION DEVICE FOR AUTOMOBILES AND LIKE VEHICLES
Original Filed March 24, 1925 2 Sheets-Sheet 1

INVENTOR
George William Bell.

June 20, 1933.  G. W. BELL  1,914,553
ANTIVIBRATION DEVICE FOR AUTOMOBILES AND LIKE VEHICLES
Original Filed March 24, 1925    2 Sheets-Sheet 2

INVENTOR
George William Bell

Patented June 20, 1933

1,914,553

UNITED STATES PATENT OFFICE

GEORGE WILLIAM BELL, OF DETROIT, MICHIGAN

ANTIVIBRATION DEVICE FOR AUTOMOBILES AND LIKE VEHICLES

Original application filed March 24, 1925, Serial No. 18,066. Divided and this application filed May 13, 1929. Serial No. 362,807.

This invention relates to anti-vibration devices of the piston and cylinder type disposed between the front wheels and axles of automobiles and like vehicles, and has for its object to improve and facilitate the steering of vehicles fitted with wheels containing the said suspension device, particularly those vehicles of medium weight.

My invention provides means for pivoting and steering the said wheels, substantially in or adjacent to the centre plane thereof, thereby reducing the turning moment or resistance to steering; and it further has for its object improvements in the method and means of mounting, demounting, and journaling the wheel on the said device, and also to improve the efficiency of the braking means connected therewith, by increasing the braking torque and the amount of braking surface engaged, and at the same time reduce the unsprung load thereof relative to the weight of the vehicle, by utilizing the outer periphery of the brake drum to act as a felloe to receive a demountable rim and tire; the said rim and engaging means as arranged being adapted to reinforce the said drum against radial distortion when subjected to high brake shoe pressure.

I will further describe my invention with the aid of the accompanying sheets of drawings, in which:—

Figure 1:
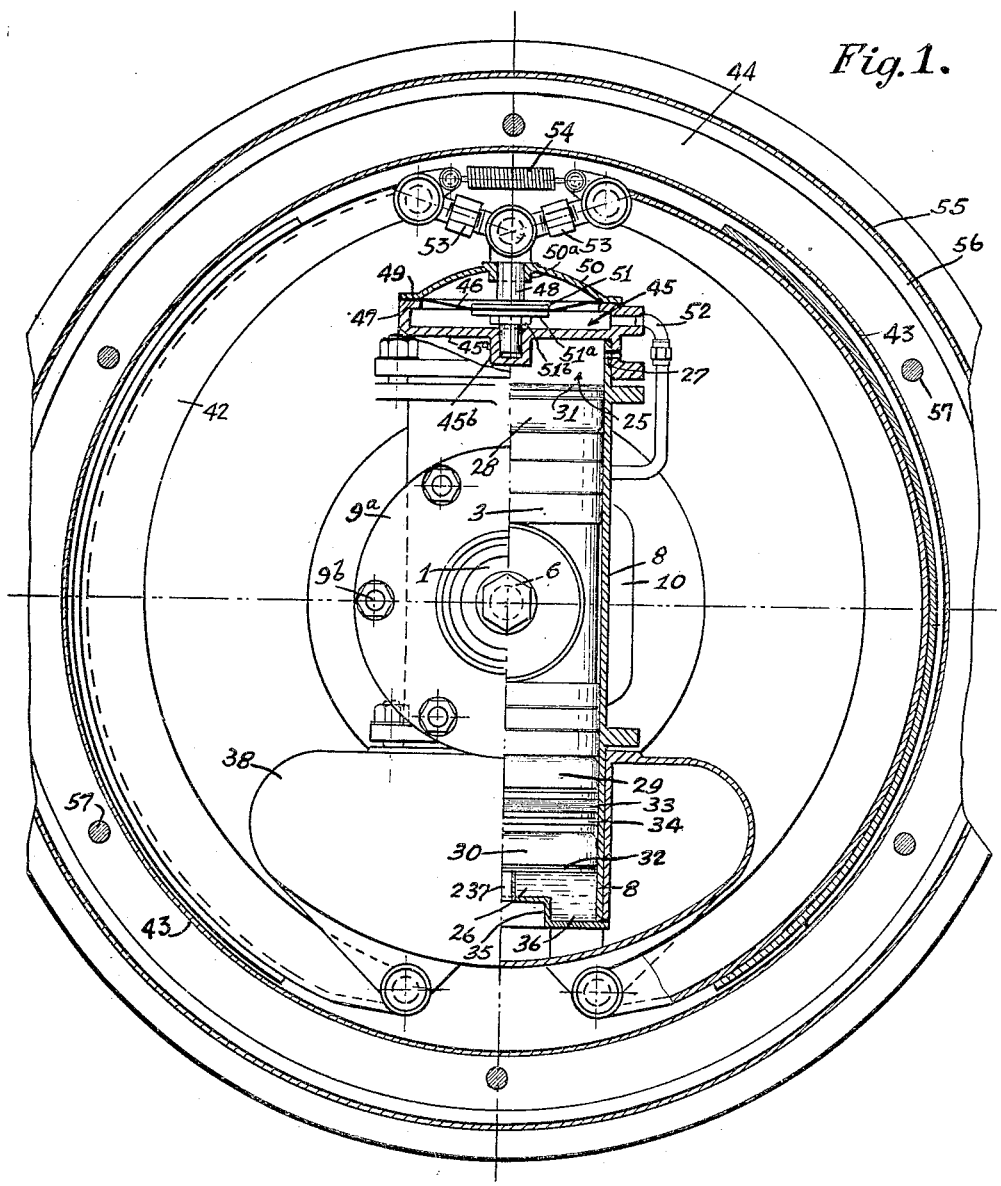
Fig. 1 is a longitudinal view of an automobile front steering wheel containing a pneumatic suspension device disposed on the end of the axle and in the vertical plane of the wheel; the cylinder of the device and brake shoes attached thereto are shown partly in section, the brake drum and tire rim are shown wholly in section.
Figure 2:
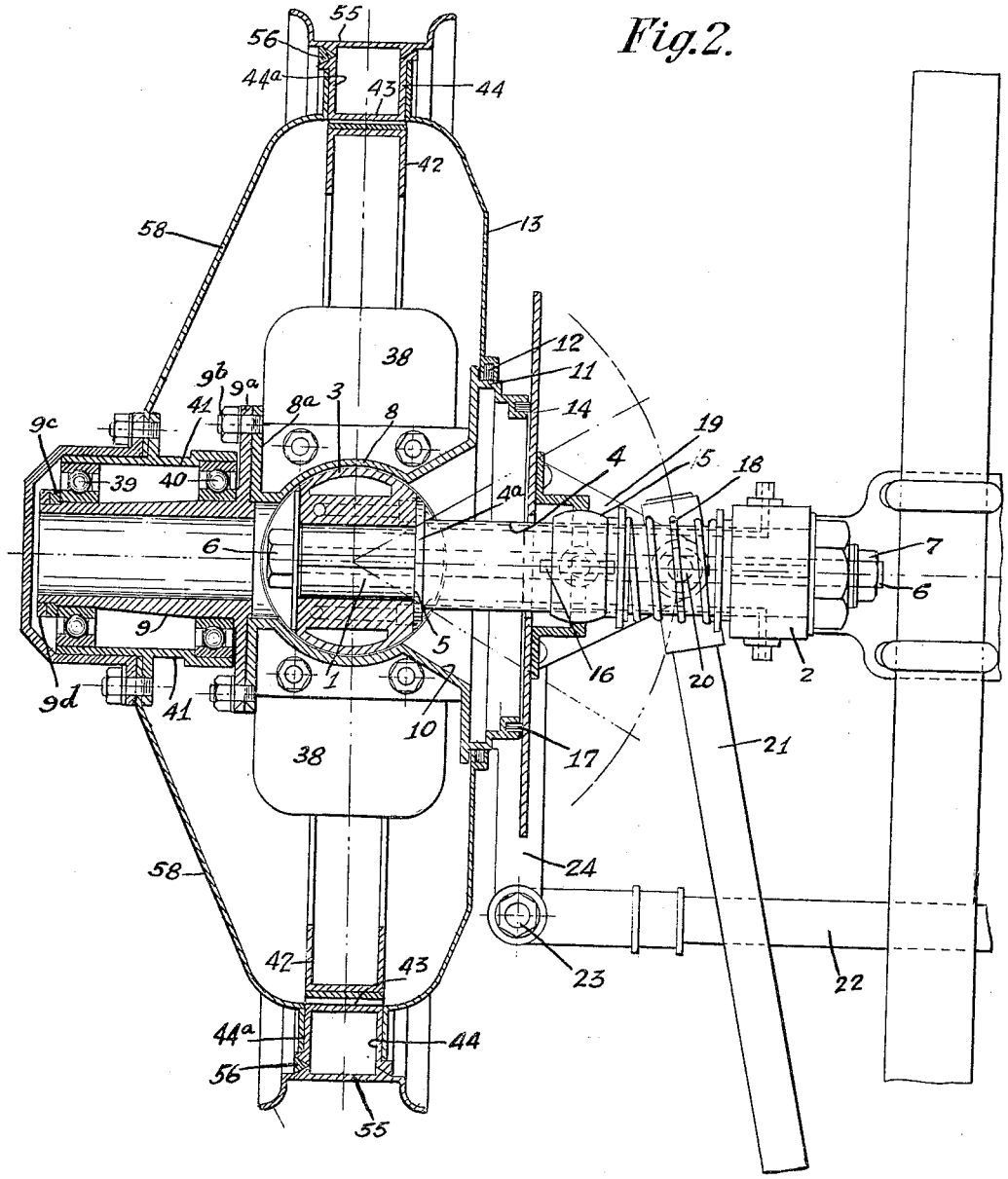
Fig. 2 is a horizontal sectional plan view taken through the centre of the device and wheel shown in Fig. 1, and illustrates the mounting and securing of the wheel and rim, and the brake parts and actuating mechanism.

Referring to Figs. 1 and 2, of the drawings, the stub axle 1 is detachably secured to the dropped axle 2 and supports at its outer end the piston 3; a sleeve 4 embraces the axle 1 and engages endwise between the axle 2 and the counterbore face 5 of the piston, the latter is secured to the axle 1 by the bolt 6 which passes through the same and is secured at its inner end by the nut 7.

Air conduits and electrical connections pass through the said sleeve to the flange 4a thereof, and automatically make connection with air passages and electric parts disposed in the piston when the latter is secured endwise on the axle 1 by the bolt 6 and nut 7.

The interior construction of the piston 1, the means of supply of air to and from the device, and the air control means are not shown in the accompanying drawings, but are substantially identical in arrangement and operation to those shown and described in the specification and drawings of the original application, Serial No. 18,066, filed March 24, 1915, and allowed November 20, 1928, as Patent Number 1,717,000, of which this is a divisional part, and are therefore not referred to here.

The piston 3 forms a steering pivot for the wheel, which is carried on the arm 9 of the cylinder 8, the latter forming a steering yoke.

The cylinder 8 which is also adapted to reciprocate vertically on the piston 3 as part of the air spring, is provided with an inner arm 10 having an opening therethrough adapted to accommodate the horizontal and vertical play of the axle 1 therein, and has formed on its outer periphery a face 11 adapted to engage with the felt dust-ring 12 disposed in the circumference of the opening of the rotating disc 13 of the wheel.

To maintain the opening in the arm dust-free a dustplate 14 is vertically pivoted on a spherical formed collar 15 which is adapted to slide horizontally on the key 16 on the axle 1 and sleeve 4. The dustplate 14 is adapted to turn in the horizontal plane on the collar 15 and in dust-proof engagement with the spherical surface of the same, and the face of the arm 10 of the cylinder 8, which is provided at its edge with a felt packing ring 17 on which the plate rubs as the wheel is turned, in steering and vibrates vertically. A spring 18 disposed between the collar 15 and the axle 2, holds the dustplate 14 in contact with the face of the arm 10 of the cylinder 8, as it moves on the piston 3.

To turn the cylinder 8 and steer the wheel in the horizontal plane a bracket 19 is attached to the lower part of the arm 10 and is provided with a ball pin 20 and universal joint attached to the drag-link 21 and thereby to the steering parts on the vehicle. The cross tube 22 connecting the steering wheels together is secured by a universal joint 23 to the cylinder arm 10 by the arm 24 attached thereto.

The suspension device comprises, air chambers 25 and 26 formed in the cylinder 8, one above and one below the axle 1. Piston 3 engages in these chambers and cooperates therewith to form two cushions the one below the axle which is formed by the space inside the piston 3 and the lower part of the cylinder 8, forming the air cushion or air spring which yieldingly supports the weight upon the wheel, and the other operating as a dashpot or check spring to check the vertical play of the cylinder 8 and the wheel supported thereon. The dashpot 25 communicates with the atmosphere under the control of the piston 3 through the vent holes or ports 27 in the wall of the cylinder.

The upper and lower ends of the piston 3 are provided with suitable cup packing rings 28, 29, and 30, secured and held in position by the threaded rings 31 and 32 on the piston 3. Between the lower cup packing rings 29 and 30 there is provided a felt oil-wiper ring 33 and a groove 34, the latter being in communication with the chamber 26, by suitable passage provided with non-return means arranged for the purpose of trapping and conserving any oil that may pass the lower cup packing ring 30.

An oil dashpot is formed in the lower part of cylinder 8 by the ferrule 35 attached thereto, which is adapted to telescopically engage in an opening in the lower face of the piston 3, (not shown in the accompanying drawings), cutting off communication between the annular space 36 formed between the cylinder wall and the ferrule 35 from the air chamber 26. The opening 37 in the ferrule affords means of communication between the space inside the piston 3 and the air reservoir 38.

By this arrangement when the piston 3 in the cylinder 8 of the device approaches the end of its displacement and engages with the ferrule 35 the oil in the annular space 36 will be forced to pass between the ferrule and the opening in the lower face of the piston 3 thereby arresting its movement.

The cylinder 8 is provided with a detachable outwardly extending arm 9 having a radial flange 9a adapted to engage with the flange 8a of the cylinder and be secured concentrically thereto by bolts 9b; bearings 39 and 40 of the wheel are carried on the said arm on which the wheel hub 41 revolves.

The wheel is secured endwise on the said bearings by a washer 9c and threaded nut 9d which is attached to the outer end of the said arm 9.

By disengaging the nut and washer from the arm the hub and wheel as a unit may be dismounted endwise from the mounted device and thereby afford access to the latter.

The lower end of the cylinder 8 is provided with an air reservoir 38 in connection with the air chamber 26 of the device for the purpose of augmenting the volume of air contained therein.

Brake shoes 42 are pivotally secured to the air reservoir 38 and are adapted to engage with the inner peripheral surface 43 of the channel section felloe ring 44 which forms the brake drum and outer part of the wheel.

The brake actuating air chamber 45 is disposed in the cylinder cap 45a and contains a flexible diaphragm 46 secured to the outer edge 47 of the chamber 45 and to a centrally vertically guided connecting element 48. The chamber 45 is made fluid tight at the outside edge thereof with the diaphragm 46, by the flange 49 of the cover 50 and the inner flange 47 of the chamber 45, and at the centre thereof, by the flanges 51 and 51a secured by nut 51b to the guide element 48.

Air under pressure is conducted to and from the said brake actuating chamber 45 by the conduit 52 which communicates with an air reservoir and control means disposed on the vehicle.

The guide element 48 is attached to the brake shoes 42 by the adjustable members 53, and is adapted to be in vertical sliding engagement in the footstep 45b of the cap 45a and the guide boss 50a of the cover 50. A spring 54 attached to each brake shoe 42 holds the said shoes free from engagement with the brake drum when not actuated.

To operate the brake air is supplied to the chamber 45 under pressure from the reservoir through a manually operated control valve disposed on the vehicle, which forces the diaphragm, together with the connecting element 48, upwards, thereby forcing the brake shoes 42 outwards until they engage the brake drum. To release the brake, air is exhausted to the atmosphere therefrom through the said control valve permitting the diaphragm to be forced downwards under the action of the spring 54.

The wheel is formed at its outer circumference by a felloe ring 44 which is connected to the hub 41 by an outer disc member 58 secured respectively to the hub by the flange 41a and bolts 41b, and to the felloe ring by engagement with the flange 49a to which it is secured by bolts 57.

The felloe ring 44 is adapted to receive at its outer peripheral edges of the radially extending flanges, the demountable rim 55 secured thereto by the wedge ring 56, and bolts 57. The latter afford means of securing the inner disc 13 to the felloe ring 44 which rotates with the wheel and maintains the inside thereof dust-free. It will be apparent that the inner disc 13 may be secured to the non-rotatable inner arm 10 instead of the ring 56 and in some cases omitted without affecting the scope of the invention.

Referring to the structural characteristics of the felloe ring 44 of the wheel, it will be apparent that the channel section affords means of strengthening the brake drum formed thereby, which is further reinforced by the application of the tire rim thereto, against radial distortion of the drum under high brake shoe pressure.

It will also be apparent that this particular construction of wheel is equally applicable to wheels other than the steering wheels here described without departing from the scope of the invention.

Referring to the fluid pressure parts it is obvious that a piston and cylinder with suitable packing may be substituted as a mechanical equivalent in lieu of the chamber and flexible diaphragm herein shown in connection with figures of the drawings and described without departing from the ambit and scope of the invention.

What I claim is:—

1. In an anti-vibration device of the type set forth, the combination of an axle, an upright piston secured to the outer end thereof, an air cylinder vertically reciprocatable and horizontally rotatable thereon, an outwardly extending arm attached to the cylinder, a wheel, the hub of which is journaled on the arm, an inwardly extending arm and an opening therethrough into the cylinder adapted to accommodate the movement of the axle therein, means for maintaining the opening dust-free, comprising, a dust-plate vertically pivoted on a sliding non-rotatable collar mounted on the axle, spring means disposed and arranged to maintain the face of the dust-plate in sliding contact with the face of the said inwardly extending arm, arranged and adapted to conform to the relative movement of the cylinder on the piston of the device, and means attached to the cylinder and to the steering parts disposed and operable on the vehicle.

2. A pneumatic anti-vibration device of the character described disposed within the plane of a wheel of an automobile, the piston of the said device being adapted to form pivotal means, and the cylinder a wheel supporting yoke, in horizontal oscillatable engagement therewith, comprising in combination an axle, an upright non-rotatable piston secured to the outer end thereof, the peripheral surfaces of the outer ends of the said piston being adapted to form piovtal bearing means, a cylinder, having an outwardly extending arm fixed thereto, and a centrally disposed opening through the inner face of the cylinder, adapted to accommodate the movement of the axle therein, the upper and lower parts of the cylinder being in reciprocatable and rotatable engagement with the said pivotal bearing means, a hollow wheel adapted to surround the device, the hub of which is journaled on the arm, and means attached to the cylinder and to the steering parts disposed on the vehicle, to horizontally oscillate the said cylinder on the pivotal piston to steer the wheel.

3. A pneumatic anti-vibration device of the character described disposed within the plane of a wheel of an automobile, the piston and cylinder of which in addition to forming the said device, are respectively adapted to form steering pivotal bearings, and a wheel supporting yoke, in reciprocatable engagement when acting as part of the said device, and in rotatable engagement to form the steering means for the said wheel, comprising in combination an axle, an upright non-rotatable piston detachably secured to the outer end thereof, the said piston being extended above and below the axle and centrally located in the wheel to form vertical pivotal bearings, in addition to forming the piston element of the said device, a cylinder having an outwardly extending arm fixed thereto and an opening therethrough adapted to permit access to the piston securing means, and a centrally disposed opening in the inner face of the cylinder adapted to accommodate the movement of the axle therein, the said cylinder being in reciprocatable engagement with the outer ends of the piston to form the said device and in rotatable engagement with the said pivotal bearings to form a steering yoke, a hollow wheel the hub of which is journaled on the arm, adapted to surround the device and support at its outer periphery a rim and tire, means detachably securing the said wheel on the arm endwise to permit access to the mounted device, and means connecting the said cylinder to the steering parts on the vehicle to guide the said wheel.

4. A pneumatic anti-vibration device of the character described disposed within the plane of a wheel of an automobile, the piston and cylinder of which in addition to forming the said anti-vibration device, are respectively adapted to form steering pivotal bearings, and a wheel supporting yoke, in reciprocatable engagement when acting as part of the said device, and in rotatable engagement to form the steering means for the said wheel, comprising in combination an axle, an upright non-rotatable piston detachably secured to the outer end thereof, the said piston being extended above and below the axle and centrally located in the wheel to form vertical pivotal bearings, in addition to forming the piston element of the said device, a cylinder having an outwardly extending arm detachably secured thereto, and an opening therethrough adapted to permit access to the piston securing means, and an inwardly extending arm having an opening in the cylinder adapted to accommodate the movement of the axle therein, including means for maintaining the said opening dust-free, the said cylinder being in reciprocatable engagement with the outer ends of the piston to form the said device, and in rotatable engagement with the said pivotal bearings to form a steering yoke, a hollow wheel the hub of which is journaled on the arm, adapted to surround the device and support at its outer periphery a rim and tire, and a bracket connecting the said cylinder to the drag-link and steering parts on the vehicle to guide the said wheel.

In testimony whereof, I affix my signature.

GEORGE WILLIAM BELL.